(12) United States Patent
Colantonio et al.

(10) Patent No.: US 7,021,350 B2
(45) Date of Patent: Apr. 4, 2006

(54) PNEUMATIC RUN-FLAT TIRE WITH POROUS ELASTOMERIC LAYER

(75) Inventors: Laurent Luigi Domenico Colantonio, Bastogne (BE); Anne Therese Peronnet-Paquin, Luxembourg (LU); Walter Dale Allen, Akron, OH (US); Frank Philpott, Waldbredimus (LU); Filomeno Gennaro Corvasce, Mertzig (LU); Giorgio Agostini, Colmar-Berg (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 185 days.

(21) Appl. No.: 10/818,724

(22) Filed: Apr. 6, 2004

(65) Prior Publication Data

US 2005/0217779 A1 Oct. 6, 2005

(51) Int. Cl.
*B60C 17/00* (2006.01)
*B60C 9/18* (2006.01)
*B60C 1/00* (2006.01)

(52) U.S. Cl. .................... 152/517; 152/209.7; 152/532
(58) Field of Classification Search ............. 152/209.7, 152/517, 532
See application file for complete search history.

(56) References Cited

U.S. PATENT DOCUMENTS

| | | | |
|---|---|---|---|
| 2,786,507 A | 3/1957 | Howe et al. | |
| 3,512,568 A | 5/1970 | Delobelle | |
| 3,516,465 A | 6/1970 | Guyot | |
| 4,287,924 A * | 9/1981 | Deck et al. | 152/517 X |
| 4,962,802 A | 10/1990 | Rohde | |
| 5,109,902 A * | 5/1992 | Kobayashi | 152/209.7 |
| 5,198,050 A | 3/1993 | Gifford | |
| 5,417,267 A * | 5/1995 | Naoi et al. | 152/209.7 |
| 5,988,247 A | 11/1999 | Tanaka | |
| 6,170,545 B1 | 1/2001 | Kobayashi et al. | |
| 6,199,612 B1 | 3/2001 | Costa Pereira et al. | |
| 6,216,757 B1 * | 4/2001 | Ohara et al. | 152/209.7 |
| 6,337,374 B1 | 1/2002 | Ngoc et al. | |
| 6,453,961 B1 | 9/2002 | Colantonio et al. | |
| 6,530,404 B1 | 3/2003 | Rooney | |

FOREIGN PATENT DOCUMENTS

| | | | |
|---|---|---|---|
| EP | 0 576 130 A1 * | 12/1993 | |
| FR | 2469297 | 5/1981 | |
| GB | 753963 * | 8/1956 | |
| JP | 06040211 A * | 2/1994 | |
| JP | 06156016 A * | 6/1994 | |
| JP | 11310019 A * | 11/1999 | |

* cited by examiner

Primary Examiner—Adrienne C. Johnstone
(74) Attorney, Agent, or Firm—Nancy T. Krawczyk

(57) ABSTRACT

Disclosed is a pneumatic run-flat tire. The tire has at least one carcass reinforcing ply, at least one pair of sidewall wedge inserts, and a belt reinforcing structure. The belt reinforcing structure is formed from at least a pair of cross cord belt reinforcing plies. Located radially outward of the carcass reinforcing ply is a porous elastomeric layer. The porous elastomeric layer has a porosity level of 20 to 80%, preferably 40–70%, of the total volume of the porous elastomeric layer.

11 Claims, 3 Drawing Sheets

PNEUMATIC RUN-FLAT TIRE WITH POROUS ELASTOMERIC LAYER

FIELD OF THE INVENTION

The present invention is directed towards a pneumatic run-flat tire. More specifically, the invention is a pneumatic self-supporting run-flat tire designed for improved comfort during inflated conditions, while maintaining full capabilities in underinflated operation.

BACKGROUND OF THE INVENTION

Pneumatic self-supporting run-flat tires have been commercialized for several years. A self-supporting run-flat tire is a tire that does not require any components, either located inside the tire cavity or external to the tire, to enable the tire to continue to operate during under-inflated conditions. Such tires are provided with internal sidewall inserts that stiffen the tire sidewalls and support the tire load during under-inflated operations.

However, the increased stiffness of the tire sidewalls can result in reduced comfort during both normal and underinflated operation. As the tire travels over road irregularities, vibrations are transferred through the stiff sidewall inserts to the vehicle, reducing ride comfort. Attempts have been made to optimize the Shore A and other hardness properties of the sidewall inserts to maximize comfort while maintaining run-flat characteristics. However, this is still a trade-off between two tire properties.

SUMMARY OF THE INVENTION

The present invention is directed to a pneumatic self-supporting tire wherein the tire's construction is optimized for ride comfort performance. The tire construction acts to lower the tire amplification of any road irregularity into the vehicle suspension system, and thus to the car body. This results in a better ride comfort performance of the tire.

The reduction of amplification is achieved through the addition of a compressible rubber layer located radially outward of the carcass reinforcing plies. The compressibility comes from a porosity designed in the rubber matrix.

In accordance with the invention, disclosed is a pneumatic run-flat tire. The tire has at least one carcass reinforcing ply, at least one pair of sidewall wedge inserts, and a belt reinforcing structure. The belt reinforcing structure is formed from at least a pair of cross cord belt reinforcing plies. Located radially outward of the carcass reinforcing ply is a porous elastomeric layer.

In various embodiments of the invention, the porous elastomeric layer is located directly adjacent to the carcass reinforcing plies, between the cross cord belt reinforcing plies, or radially outward of the cross cord belt reinforcing plies, either radially inward or radially outward of any zero degree overlay ply present in the tire.

In one aspect of the disclosed invention, the porous elastomeric layer has a porosity level of 20 to 80%, preferably 40–70%, of the total volume of the porous elastomeric layer. The principal elastomer of the porous layer may be the same principal elastomer used in any adjacent layer, thus assisting in bonding the porous layer to the adjacent ply layers in the tire. The porosity of the layer is achieving by adding a blowing agent to the elastomer during compounding of the elastomer. The blowing agent is activated during vulcanization of the elastomer, which may occur either during curing of the entire tire or during partial vulcanization of the layer prior to addition of the porous layer during building of the green tire.

In another aspect of the invention, the porous elastomeric layer has a minimal axial width $W_C$ at least equal to 20% of the axial width $W_{SB}$ of the smallest width cross cord belt reinforcing ply. Preferably, the porous elastomeric layer has a minimal axial width $W_C$ at least equal to 60% of the axial width $W_{SB}$ of the smallest width cross cord belt reinforcing ply. The porous elastomeric layer has a maximum axial width $W_C$ at most equal to 115% of the axial width $W_B$ of the widest width cross cord belt reinforcing ply. Preferably, the porous elastomeric layer has a maximum axial width $W_C$ at most equal to 100% of the axial width $W_B$ of the widest width cross cord belt reinforcing ply.

In another aspect of the present invention, the porous elastomeric layer has a radial thickness $T_C$ at least equal to 50% of the radial thickness $T_B$, $T_P$ of either an adjacent carcass reinforcing ply or an adjacent cross cord belt reinforcing ply. Preferably, the porous elastomeric layer has a maximum radial thickness $T_C$ of at most three times the radial thickness $T_B$, $T_P$ of either an adjacent carcass reinforcing ply or an adjacent cross cord belt reinforcing ply.

In another aspect of the present invention, the tire tread is comprised of a tread cap layer and a tread base layer. In such a tire, the tread cap layer and the tread base layer are conventionally formed of different elastomers, each layer seeking to provide a specific characteristic to the tire tread. When such a tread construction is employed with the present invention, the porous elastomeric layer is located radially inward of the tread base layer. When the porous elastomeric layer is directly adjacent to any tread layers, the porous elastomeric layer is a distinct and different layer from the tread layers, and from any tread base layer located within the tire.

Definitions

The following definitions are controlled for the disclosed invention.

"Annular"; formed like a ring.

"Axial" and "axially" are used herein to refer to lines or directions that are parallel to the axis of rotation of the tire.

"Bead" means that part of the tire comprising an annular tensile member wrapped by ply cords and shaped, with or without other reinforcement elements such as flippers, chippers, apexes, toe guards and chafers, to fit the design rim.

"Belt structure" means at least two annular layers or plies of parallel cords, woven or unwoven, underlying the tread, unanchored to the bead, and having both left and right cords angles in the range from 17° to 27° with respect to the equatorial plane of the tire.

"Carcass" means the tire structure apart from the belt structure, tread, undertread, and sidewall rubber over the plies, but including the beads.

"Circumferential" means lines or directions extending along the perimeter of the surface of the annular tire parallel to the tire Center Line (CL) and perpendicular to the axial direction.

"Harshness"; the amount of disturbance transmitted by a tire when it passes over minor but continuous road irregularities.

"Spring Rate"; the stiffness of tire expressed as the slope of the load deflection curve at a given pressure.

BRIEF DESCRIPTION OF THE DRAWINGS

The invention will be described by way of example and with reference to the accompanying drawings in which.

DETAILED DESCRIPTION OF THE INVENTION

Figure 1:
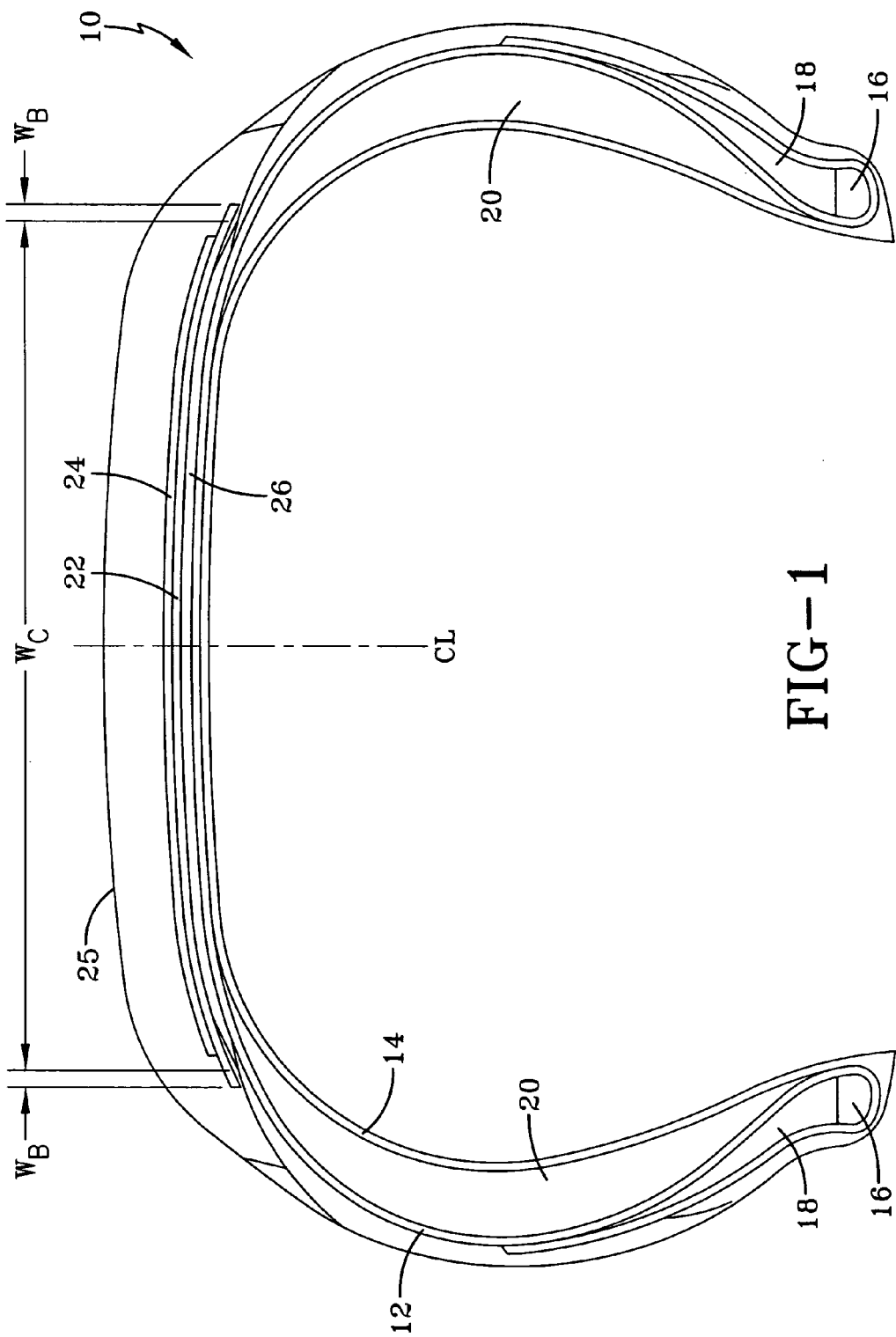
FIG. 1 is a cross sectional view of a self-supporting run-flat tire in accordance with the present invention.

The following language is of the best presently contemplated mode or modes of carrying out the invention. This description is made for the purpose of illustrating the general principles of the invention and should not be taken in a limiting sense. The scope of the invention is best determined by reference to the appended claims. The reference numerals as depicted in the drawings are the same as those referred to in the specification. For purposes of this application, the various embodiments illustrated in the figures each sue the same reference numeral for similar components. The structures employed basically the same components with variations in location or quantity thereby giving rise to the alternative constructions in which the inventive concept can be practiced.

FIG. 1 illustrates a cross-sectional view of a self-supporting runflat tire 10 according to the present invention. Although not limited thereto, the illustrated tire 10 is of an intermediate aspect ratio. It has a carcass structure comprising a carcass reinforcing ply 12, a gas-impervious inner liner 14, a pair of beads 16, a pair of bead filler apexes 18, and a pair of sidewall wedge inserts 20. Each sidewall wedge insert 20 is located between the carcass reinforcing ply 12 and the inner liner 14. It will be appreciated by those skilled in the art that multiple reinforcing plies may be employed as carcass reinforcing plies, as well as multiple sidewall wedge inserts in a variety of configurations for both single and multiple carcass reinforcing plies.

Located radially outward of the carcass structure is a belt structure. The belt structure has at least two cross cord reinforcing plies 22, 24. The plies 22, 24 are inclined at angles of 18° to 35° relative to the tire centerline CL, with the cords in each ply 22, 24 being oppositely inclined relative to the cords in the adjacent ply. While not illustrated in FIG. 1, radially outward of the cross cord reinforcing plies 22, 24, an overlay ply may be placed. An overlay ply has cords inclined at approximately 0° relative to the tire centerline CL, and has an axial width greater than the widest cross cord reinforcing ply 22 or 24 so as to completely cover the edges of all the cross cord reinforcing plies 22, 24, see FIG. 3.

Radially outward of the belt structure is a tread 25. The tread 25 will has a tread pattern comprised of a series of lateral and circumferential grooves, not illustrated. The tread is conventionally formed of a single elastomer, but may also be comprised of multiple elastomers, the different elastomers arranged radially in a cap/base formation or axially to create a zoned tread.

In accordance with one embodiment of the present invention, located between the carcass reinforcing ply 12 and the belt structure is a cushion layer 26. Formulated as a porous elastomeric component, the layer 26 acts as a cushion for impact filtering, taking advantage of the compressible nature of the cushion material to filter and dampen vibrations or impacts coming from the road. The cushion layer 26 is compounded from a conventional elastomeric base, the base selected to be compatible with adjacent elastomers. Preferably, the base elastomer is the same base elastomer that coats the reinforcing cords of the adjacent belt reinforcing plies 22, 24 or the carcass reinforcing ply 12. The elastomer is provided with a blowing agent in an amount sufficient to result in a 20 to 80% post-cure porosity level, i.e. 20 to 80% of the total volume of the cushion layer 26 is cellular or empty of elastomer. Preferably, the porosity level of the elastomer is in the range of 40% to 70%.

To achieve the desired cushioning effect, the cushion layer 26 has an axial width $W_C$ at least equal to 20%, preferably equal to 60%, of the axial width of the smallest width belt reinforcing ply $W_{SB}$. At a maximum, the cushion layer 26 has an axial width $W_C$ equal to 115% the axial width of the belt structure $W_B$, a preferred maximum axial width $W_C$ equal to 100% of the axial width $W_B$ of the belt structure. The axial width $W_B$ being equivalent to the width of the widest cross cord reinforcing ply 22 or 24.

Figure 2:
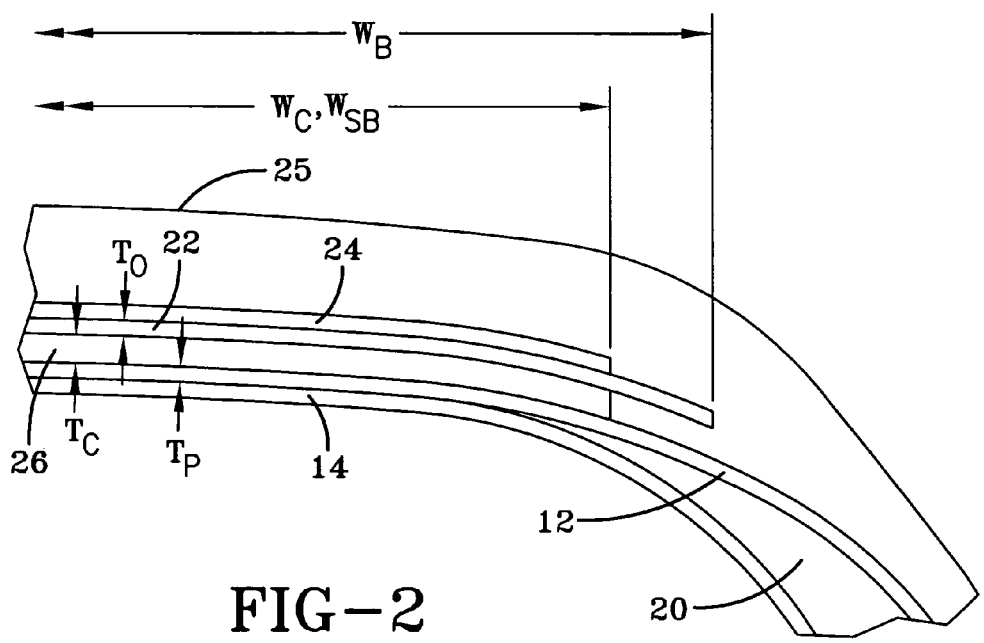
FIG. 2 is a cross sectional view of the belt structure of the tire of FIG. 1.

The radial thickness $T_C$ of the cushion layer 26 is at least equal to 50% of the radial thickness of the adjacent cross cord belt reinforcing layer $T_B$ or the radial thickness $T_P$ of the adjacent carcass ply 12, see FIG. 2. The cushion layer 26 has a radial thickness $T_C$ of at most three times the radial thickness $T_B$ or $T_P$ of an adjacent crossed cord belt ply 22 or 24 or carcass ply 12.

Figure 3:
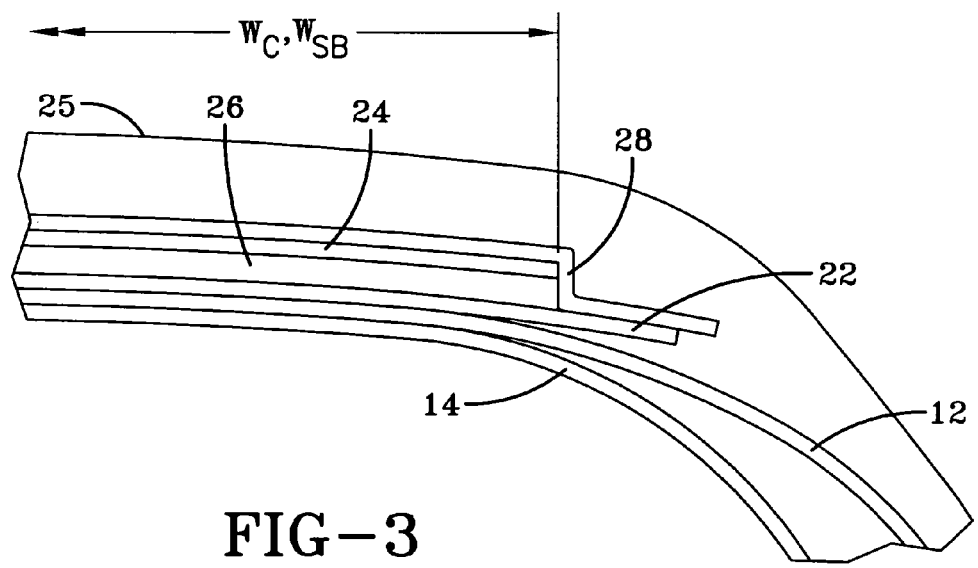
FIGS. 3 to 5 are alternative embodiments of the present invention.

FIG. 3 illustrates another embodiment of the present invention. The cushion layer 26 is located between the cross cord belt reinforcing plies 22, 24. In the illustrated embodiment, the cushion layer 26 has an axial width $W_C$ equal to the axial width $W_{SB}$ of the smallest width belt reinforcing ply 24, and a radial thickness $T_C$ approximately twice the radial thickness of either adjacent belt ply 22, 24. Also illustrated, radially outward of the outermost cross cord reinforcing ply is an overlay ply 28. The cushion layer 26 in this embodiment, wherein the cushion layer 26 is located between a pair of cross cord reinforcing plies 22, 24, has the same preferred axial width $W_C$ ranges and radial thickness $T_C$ ranges as discussed above for the tire of FIGS. 1 and 2.

To test the theory of the use of a cushion layer 26, three tires were built, the tires being of identical size and construction, except for the absence or presence and location of a cushion layer. The tire size was 225/45R17, with multiple carcass reinforcing plies and multiple sidewall inserts in each tire sidewall. The belt structure of each tire included two cross cord reinforcing plies, and an overlay ply. The first tire did not have a cushion layer, and is considered the control tire.

The second tire, tire A, had a cushion layer located between adjacent cross cord belt reinforcing plies, similar to that illustrated in FIG. 3. The third tire, tire B, had a cushion layer located between the radially innermost belt reinforcing ply and the radially outermost carcass reinforcing ply, similar to that illustrated in FIG. 1.

TABLE 1

|  | Control | A | B |
|---|---|---|---|
| Thickness of cushion layer | — | 3.5–4 mm | 4.5–5 mm |
| Width of cushion layer | — | Equal to $W_{SB}$ | Equal to $W_{SB}$ |
| Porosity level of cushion layer | — | ~50% | ~50% |
| Tire Weight, kg | 11.7 | 12.45 | 12.6 |

The addition of the cushion layer for tires A and B increased the tire weight by 6.5% and 7.7%, respectively.

The tires were subjected to numerous tests; with the results shown in Table 2 and discussed below.

TABLE 2

|  | Control | A | B |
|---|---|---|---|
| Lab Runflat Test | 100 | 94 | 101 |
| Steerability | 100 | 113 | 102 |
| Cornering Ability | 100 | 113 | 92 |
| Comfort | 100 | 105 | 99 |
| Rolling Noise | 100 | 105 | 94 |

The inventive tires were subjected to a runflat test to compare the tires' runflat abilities compared to the control tire. The lab runflat test, operated at 38° C., involved deflating the tires, loading the tires with an initial load equal to 55% of the tires' rated load carrying capacity, and running the tires at 88 kph. After a warm-up period of 176 km, the tire load is increased 5% every 88 km until the tires' runflat capacity is determined. The lab runflat test shows that the tires comprising a cushion layer were capable of achieving comparable run-flat distances to the control/conventional run-flat tire. The numbers reported in Table 2 are normalized milages, where the mileage of the control tire is normalized at 100.

Steerability, cornering ability, comfort, and rolling noise are all subjective tests. The control tire has a value of 100 in all subjective categories, with tires A and B judged relative to the control tire. Tire A rated higher in all subjective areas than the control tire. Tire B showed improved in steerability, with comparable performance in comfort; cornering ability and rolling noise were not at the same level as the control tire, however, the results are in the satisfactory range.

The eigen frequencies of the different inventive tires and the control tires when attached to a fixed axle were measured. The vertical (respectively tangential) direction is aligned with a vector perpendicular to the contact patch (respectively with a vector parallel to the contact patch, pointing in the travelling direction). The values are reported in Table 3 below.

TABLE 3

|  | Control | A | B |
|---|---|---|---|
| 1st vertical mode | 88 Hz | 85 Hz | 79 Hz |
| 1st tangential mode | 37 Hz | 36 Hz | 34 Hz |
| 2nd tangential mode | 100 Hz | 98 Hz | 92 Hz |

As those skilled in the art will appreciate, a shift of the resonance frequency to lower values indicates that lower levels of forces are transmitted by the tire into the car body in the frequency range where that resonance is located. Those results demonstrate the filtering effect of the proposed constructions.

The tires were also tested to determine the lifting amount of the tread center during run-flat operation, with results shown in Table 4. The tires were loaded with 400 kg at an inflation pressure of 0.0 bar. The lift off amount and the remaining section height were determined.

TABLE 4

|  | Control | A | B |
|---|---|---|---|
| Lift off, mm | 9.14 | 5.20 | 4.60 |
| Remaining Section Height, mm | 58.0 | 61.3 | 61.15 |

The inventive tires showed a reduced lift off value and retained a greater section height during run-flat operation. The cushion layer 26, while providing dampening to the tire, also acts to maintain the tread configuration during run-flat operation.

Figure 4:
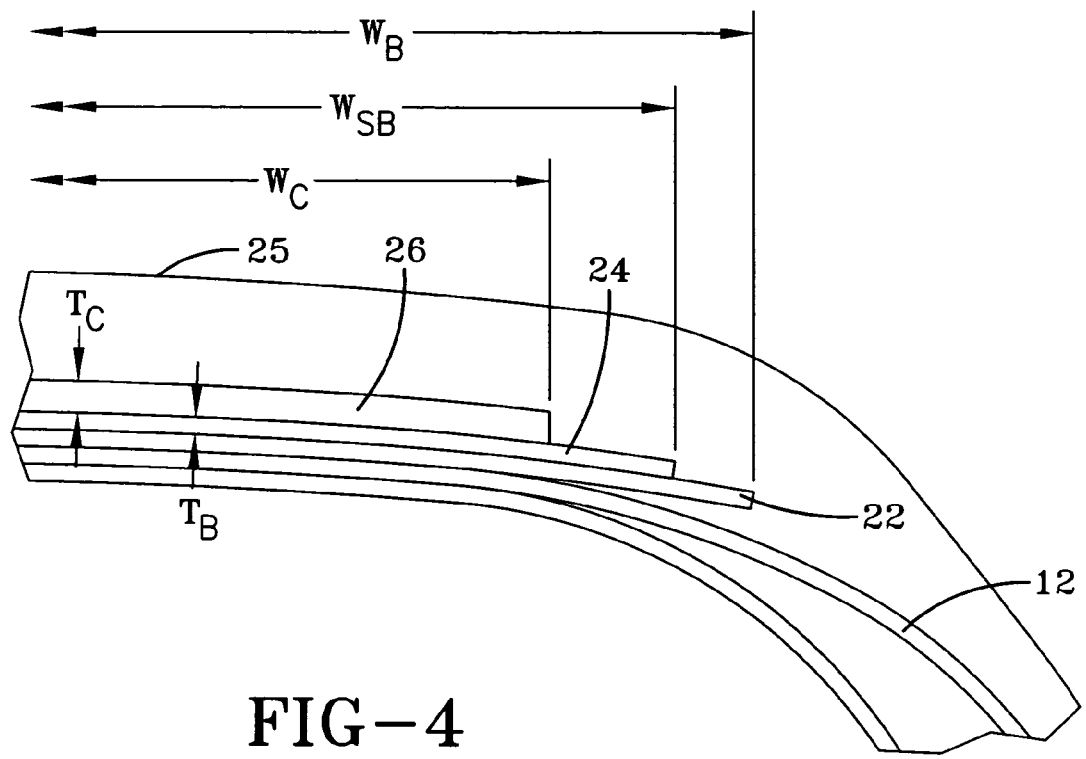

FIG. 4 illustrates another embodiment of the present invention. The cushion layer 26 is located radially outward of both cross-cord belt plies 22, 24. The cushion layer 26 has a width $W_C$ less than the width $W_{SB}$ of the smallest width cross-cord belt ply 24. The radial thickness $T_C$ of the cushion layer 26 is more than twice the radial thickness $T_B$ of the adjacent belt ply 24.

Figure 5:
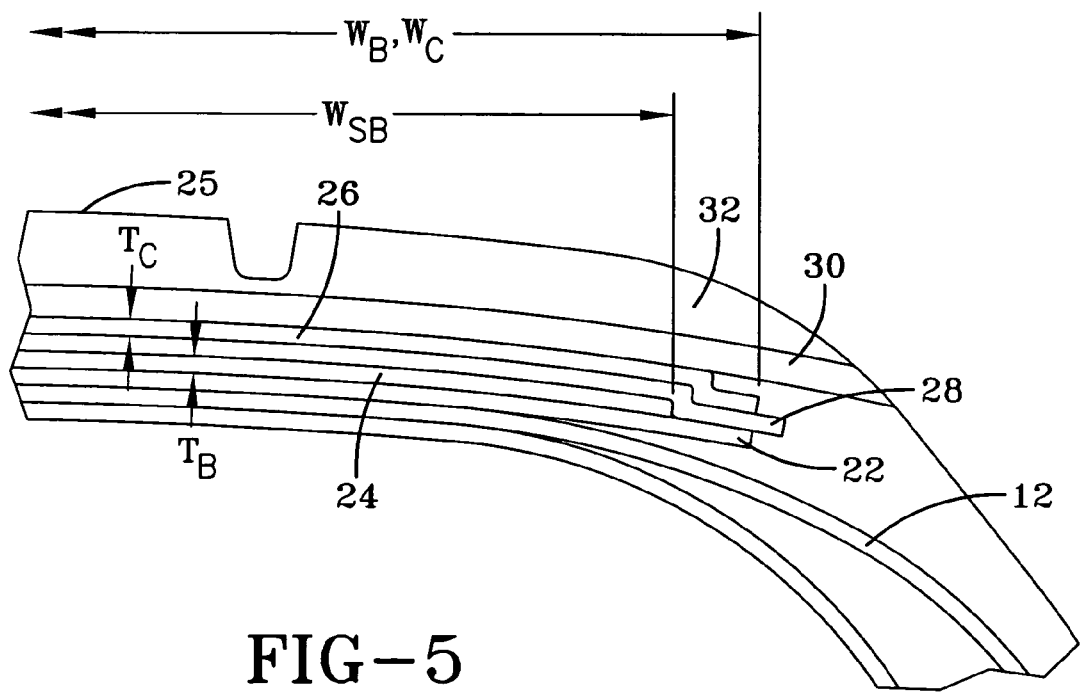

In the embodiment of FIG. 5, the cushion layer 26 is located radially outward of the overlay ply 28. The cushion layer 26 has a width $W_C$ equal to the belt width $W_B$, and a radial thickness $T_C$ approximately equal to the radial thickness $T_B$ of the most adjacent cross-cord belt ply 24. Also shown in this embodiment, the tread 25 is formed of radially adjacent rubber layers, the tread cap 32 and the tread base 30. The cushion layer 26 is distinct and different from the tread base 30, and directly adjacent to the tread base 30.

No matter the location of the cushion layer 26, the width $W_C$ has a minimum axial width $W_C$ at least equal to 20% of the axial width of the smallest width belt reinforcing ply $W_{SB}$ and a maximum axial width of 115% the axial width of the belt structure $W_B$. A preferred axial width $W_C$ range is 60% of the axial width of the smallest width belt reinforcing ply $W_{SB}$ and to 100% the axial width of the belt structure $W_B$. The radial thickness $T_C$ of the cushion layer 26 ranges from 50% to 300% of the most adjacent carcass or belt reinforcing ply.

The present invention, employing the use of a porous layer in a self-supporting run-flat tire, improves the comfort performance of the run-flat tire, while also reducing tread life during operation. The tire exhibits comparable run-flat tire performance to a conventional run-flat tire.

What is claimed is:

1. A pneumatic run-flat tire, the tire comprising at least one carcass reinforcing ply, at least one pair of sidewall wedge inserts, and a belt reinforcing structure, the belt reinforcing structure comprising at least a pair of cross cord belt reinforcing plies, the tire being characterized by a porous elastomeric layer located radially outward of the at least one carcass reinforcing ply and radially inward of the radially outermost cross cord belt reinforcing ply, wherein the porous elastomeric layer has a radial thickness $T_C$ at least equal to 50% of and at most three times the radial thickness $T_B$, $T_P$ of either an adjacent carcass reinforcing ply or an adjacent cross cord belt reinforcing ply.

2. The tire of claim 1 wherein the porous elastomeric layer is directly adjacent to the at least one carcass reinforcing ply.

3. The tire of claim 1 wherein the porous elastomeric layer is located between the pair of cross cord belt reinforcing plies.

4. The tire of claim 1 wherein the porous elastomeric layer has a porosity level of 20 to 80% of the total volume of the porous elastomeric layer.

5. The tire of claim 1 wherein the porous elastomeric layer has a porosity level of 40 to 70% of the total volume of the porous elastomeric layer.

6. The tire of claim 1 wherein the porous elastomeric layer has an axial width $W_C$ at least equal to 20% of the axial width $W_{SB}$ of the smallest width cross cord belt reinforcing ply.

7. The tire of claim 1 wherein the porous elastomeric layer has an axial width $W_C$ at least equal to 60% of the axial width $W_{SB}$ of the smallest width cross cord belt reinforcing ply.

8. The tire of claim 1 wherein the porous elastomeric layer has an axial width $W_C$ of at most equal to 115% of the axial width $W_B$ of the widest width cross cord belt reinforcing ply.

9. The tire of claim 1 wherein the porous elastomeric layer has an axial width $W_C$ of at most equal to 100% of the axial width $W_B$ of the widest width cross cord belt reinforcing ply.

10. The tire of claim 1 wherein the porous elastomeric layer has a composition wherein the principal elastomer is the same as that present in either the adjacent reinforcing carcass ply or an adjacent cross cord belt reinforcing layer.

11. The tire of claim 1, the tire further comprising a tread, the tread having a tread cap layer and a tread base layer, the porous elastomeric layer being located radially inward of the tread base layer.

* * * * *